(12) United States Patent
Eck

(10) Patent No.: US 7,204,661 B2
(45) Date of Patent: Apr. 17, 2007

(54) PIPELINE SYSTEM UTILIZING COLD BENDS

(75) Inventor: Daniel J. Eck, Anchorage, AK (US)

(73) Assignee: Conocophillips Company, Houston, TX (US)

( * ) Notice: Subject to any disclaimer, the term of this patent is extended or adjusted under 35 U.S.C. 154(b) by 311 days.

(21) Appl. No.: 10/458,463

(22) Filed: Jun. 10, 2003

(65) Prior Publication Data

US 2004/0253058 A1  Dec. 16, 2004

(51) Int. Cl.
 *F16L 1/24* (2006.01)

(52) U.S. Cl. .................... 405/184.4; 405/156

(58) Field of Classification Search .......... 405/184.4, 405/184.1, 184, 174, 168.1, 158
See application file for complete search history.

(56) References Cited

U.S. PATENT DOCUMENTS

| | | | | |
|---|---|---|---|---|
| 4,007,622 A | * | 2/1977 | Galperin et al. | 72/393 |
| 4,062,216 A | * | 12/1977 | Hanamoto et al. | 72/128 |
| 4,098,106 A | * | 7/1978 | Yamaguchi | 72/128 |
| 4,122,697 A | * | 10/1978 | Hanyo et al. | 72/128 |
| 4,130,925 A | * | 12/1978 | Gibson | 405/174 |
| 4,140,292 A | * | 2/1979 | Kaigler, Jr. | 248/49 |
| 4,452,550 A | * | 6/1984 | Hofmeester | 405/184.5 |
| 4,560,125 A | | 12/1985 | Hess | |
| 5,192,166 A | * | 3/1993 | Persson | 405/168.1 |
| 5,403,121 A | * | 4/1995 | Lanan | 405/158 |
| 5,452,967 A | * | 9/1995 | Fuller | 405/184 |
| 6,298,706 B1 | * | 10/2001 | Dunn | 72/369 |
| 6,353,988 B1 | | 3/2002 | Smith et al. | |
| 6,450,736 B1 | | 9/2002 | Eck et al. | |

* cited by examiner

*Primary Examiner*—Frederick L. Lagman
(74) *Attorney, Agent, or Firm*—Kameron D. Kelly; Ryan N. Cross

(57) ABSTRACT

An expansion loop for an above-ground pipeline that utilizes cold bent pipe sections having a bend angle of less than 90 degrees and a bend rate (in degrees per foot) of relatively low severity.

46 Claims, 1 Drawing Sheet

PIPELINE SYSTEM UTILIZING COLD BENDS

BACKGROUND OF THE INVENTION

1. Field of the Invention

The present invention relates generally to above-ground pipelines. In another aspect, the invention concerns expansion loops utilized in elevated hydrocarbon pipelines.

2. Description of the Prior Art

It is well known that land-based pipelines are commonly used to transport hydrocarbons (e.g., oil and/or gas) from remote production areas to processing and/or end use facilities. Due to aesthetics, economics, and other reasons, these pipelines are typically buried in the ground whenever practical. However, in some regions, buried pipelines cannot be used because of the nature of the terrain through which the pipeline passes. Examples of terrain that necessitates the use of above-ground pipelines include permafrost regions, regions of rugged terrain, and regions with active seismic faults. In these types of terrain, elevated pipelines are often used to transport hydrocarbons to their destinations.

For example, in building conventional elevated pipelines across the permafrost terrain of North Slope, Ak., a plurality of vertical supports (e.g., 5 feet tall) are installed across the terrain at approximately 45 to 65 foot intervals. A long section of pipeline is welded together and then raised on to these vertical supports. Sliding surfaces are provided between the pipeline and each of the vertical supports to thereby allow slight relative movement therebetween. At spaced intervals (e.g., 1500 feet), the pipeline is fixed to a vertical and horizontal anchor. "Expansion loops" are spaced (e.g., every 1500 feet) within the pipeline to compensate for any substantial thermal expansion/contraction of the pipeline between any two adjacent fixed anchors.

FIGS. 1A and 1B schematically illustrate a conventional pipeline 10 supported above the ground 12 by a plurality of vertical supports 14 and including a conventional expansion loop 16. The conventional expansion loop 16 includes a plurality of 90° bends 18 with a straight pipe section 20 extending between the 90° bends 18. Typically, the conventional 90° bends 18 used in the expansion loop 16 have a bend radius of about 3 D, where "D" is the nominal diameter of the pipe employed in the 90° bend 18. Due to the severity of the curvature of the conventional 90° bends 18 (e.g., bend rates of 10 to 20 degrees per foot), the conventional 90° bends 18 are typically made by induction bending a "mother" pipe that has a special metallurgy and/or wall thickness different from that of the straight pipe sections 20,22 used in the pipeline 10.

One disadvantage of using 90° bends with relatively severe bend rates in the above-ground pipeline is the high pressure drop and slugging forces associated with the 90° bends. A further disadvantage of using conventional 90° bends in above-ground pipelines is that only a few facilities have the capability of induction bending large diameter (e.g., greater than 12 inch nominal diameter) mother pipes. These induction bending facilities capable of forming the 90° bends are typically located a great distance (e.g., thousands of miles) from the pipeline location where the 90° bends will ultimately be installed. Thus, the 90° bends must be shipped a substantial distance from the bending location to the installation location. Further, due to their shape, the conventional 90° bends must typically be shipped separate from the straight pipe sections used for the rest of the pipeline. This separate fabrication and shipping of the 90° bends can be expensive and can cause time delays.

In a conventional below-ground pipeline used to transport corrosive hydrocarbons, high density polyethylene (HDPE) liners are typically used to provide corrosion and erosion resistance for the metallic pipe sections. However, in above-ground pipelines the 90° bends of a conventional expansion loop typically do not allow the pipeline to be lined with HDPE because doing so would require the incorporation of a flange at every bend. Incorporating a flange at every 90° bend is impractical because of the cost and leakage risk associated with each flange. Thus, unlined conventional 90° bends tend to corrode and erode at a greater rate than the lined straight pipe sections of the pipeline.

OBJECTS AND SUMMARY OF THE INVENTION

It is, therefore, an object of the present invention to provide an expansion loop for an above-ground pipeline that does not require the curved pipe sections of the expansion loop to be induction bent from a mother pipe having a different metallurgy and/or wall thickness than the straight pipe sections of the pipeline.

A further object of the invention is to provide an expansion loop that reduces pressure drop and slugging forces associated therewith.

Another object of the invention is to provide an expansion loop that allows a HDPE liner to be installed therein without requiring a flange for every bent section of pipe.

It should be understood that the above-listed objects are only exemplary, and not all the objects listed above need be accomplished by the invention described and claimed herein.

Accordingly, in one embodiment of the present invention, there is provided an above-ground pipeline that comprises a first cold bent pipe section having a nominal diameter (D) and a bend radius in the range of from about 10 D to about 100 D.

In another embodiment of the present invention, there is provided an expansion loop of an above-ground pipeline comprising a first bent pipe section and a first substantially straight pipe section. The first bent pipe section presents first and second ends, with the first substantially straight pipe section being coupled to the first end of the first bent pipe section. The wall thickness of the first bent pipe section and the first substantially straight pipe section are substantially identical.

In a further embodiment of the present invention, there is provided a method of constructing an above-ground pipeline that includes the step of cold bending a first substantially straight pipe section to thereby form a first bent pipe section having a nominal diameter (D) and a bend radius in the range of from about 10 D to about 100 D.

In still another embodiment of the present invention, there is provided a method of constructing an above-ground pipeline comprising the steps of: (a) fabricating a first substantially straight pipe section at a fabrication location, said first substantially straight pipe section having a length in the range of from about 30 to about 100 feet and a nominal diameter (D) in the range of from about 0.5 to about 6 feet; (b) transporting the first substantially straight pipe section to a bending location at least 50 miles from the fabrication location; and (c) cold bending the first substantially straight pipe section at the bending location to thereby form a bent pipe section having a bend radius in the range of from about 10 D to about 100 D and a bend angle in the range of from about 10 to about 60 degrees.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1A:
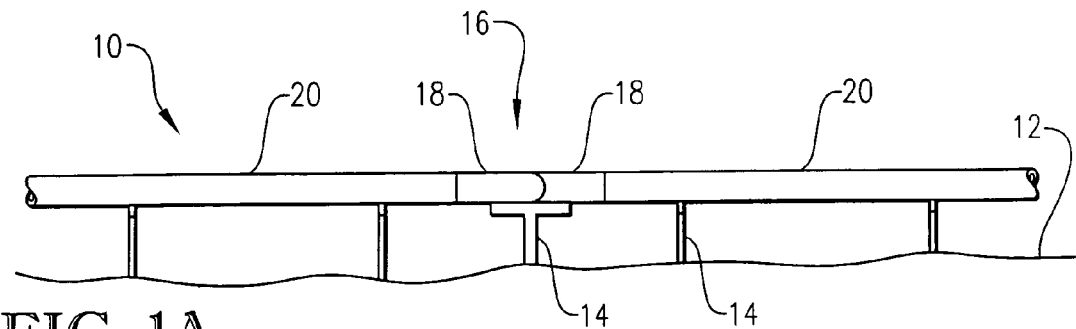
FIG. 1A is an elevation view of a prior art above-ground hydrocarbon pipeline employing a conventional expansion loop that utilizes 90° bends having a relatively severe bend rate.
Figure 1B:
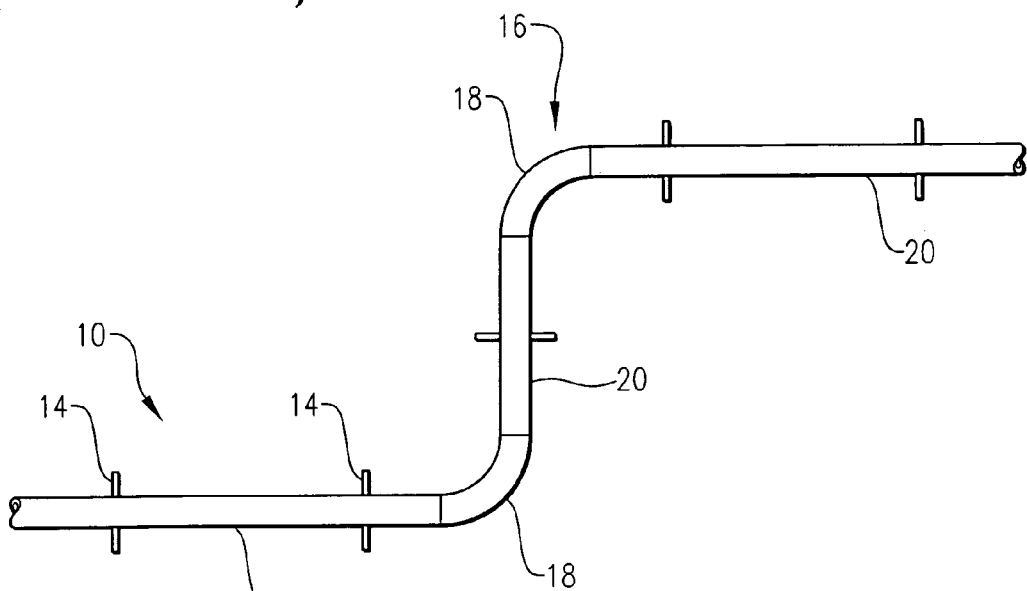
FIG. 1B is a top view of the prior art hydrocarbon pipeline shown in FIG. 1A.
Figure 2:
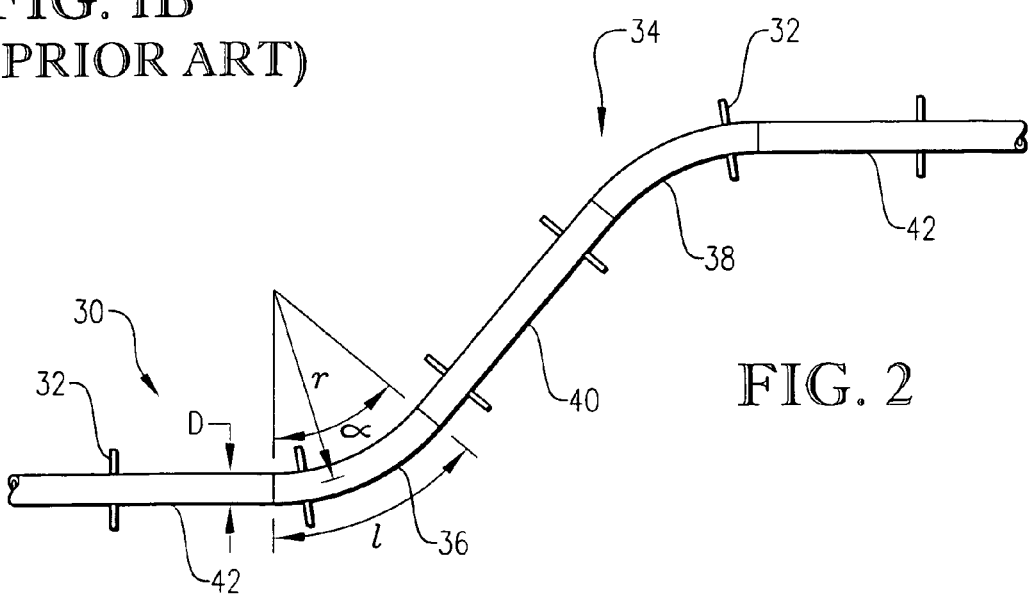
FIG. 2 is a top view of an above-ground pipeline including an expansion loop constructed in accordance with the principles of the present invention, particularly illustrating the use of cold bent pipe sections having a bend angle of less than 90 degrees and a bend rate of relatively low severity.

Referring to FIG. 2, an above-ground pipeline 30 is illustrated as including a plurality of vertical supports 32 and an expansion loop 34. Preferably, pipeline 30 is an elevated pipeline used to transport hydrocarbons (e.g., oil and/or gas). Alternatively, pipeline 30 is a water line. Expansion loop 34 includes a first cold bent pipe section 36, a second cold bent pipe section 38, and a substantially straight pipe section 40 fluidly disposed between first and second cold bent pipe sections 36,38. As used herein, the term "cold bent" shall be descriptive of an object, such as a section of pipe, that was initially formed in a substantially straight configuration, but later bent from that substantially straight configuration without significant heating of the object. As used herein, the term "above-ground pipeline" shall denote a pipeline that is supported above the surface of the earth by a plurality of vertical support members spaced along the pipeline. As used herein, the term "expansion loop" shall denote a portion of an above-ground pipeline that uses lateral offsetting to accommodate for axial expansion/contraction of the pipeline.

As shown in FIG. 2, first cold bent pipe section 36 can be defined by a bend angle ($\alpha$), a bend radius (r), and a length (l). It is preferred for the bend angle ($\alpha$) of first cold bent pipe section 36 to be in the range of from about 10 to about 60 degrees, more preferably about 20 to about 50 degrees, still more preferably about 25 to about 45 degrees, and most preferably 30 to 40 degrees. It is preferred for the bend radius (r) of first cold bent pipe section 36 to be in the range of from about 10 D to about 100 D, where "D" is the nominal diameter of first cold bent pipe section 36. More preferably, the bend radius (r) of first cold bent pipe section 36 is in the range of from about 15 D to about 75 D, still more preferably about 20 D to about 50 D, even more preferably about 25 D to about 45 D, and most preferably 30 D to 40 D. It is preferred for the length (l) of first cold bent pipe section 36 to be in the range of from about 10 to about 200 feet, more preferably about 30 to about 100 feet, still more preferably about 40 to about 80 feet, and most preferably 50 to 70 feet.

First cold bent pipe section 36 can also be defined by its "bend rate," which measures the severity of the bend in first cold bent pipe section 36 in degrees per foot. Preferably, first cold bent pipe section 36 has a bend rate in the range of from about 0.1 to about 10 degrees per foot, more preferably about 0.25 to about 5 degrees per foot, and most preferably 0.5 to 2 degrees per foot. First cold bent pipe section 36 preferably has a nominal diameter in the range of from about 0.25 to about 10 feet, more preferably about 0.5 to about 6 feet, still more preferably about 0.75 to about 4 feet, even more preferably about 1 to about 3 feet, and most preferably 1.5 to 2.5 feet. The wall thickness of first cold bent pipe section 36 is preferably in the range of from about 0.005 D to about 0.25 D (where "D" is the nominal diameter of pipe section 36), more preferably about 0.005 D to about 0.2 D, and most preferably 0.005 D to 0.15 D.

It is preferred for second cold bent pipe section 38 to have a substantially similar configuration to that of first cold bent pipe section 36. Thus, second cold bent pipe section 38 preferably has the same bend angle ($\alpha$), bend radius (r), length (l), bend rate, nominal diameter, and wall thickness as first cold bent pipe section 36. However, as shown in FIG. 2, when expansion loop 34 is assembled, it is preferred for first and second cold bent pipe sections 36,38 to be curved/bent along a common (typically horizontal) plane, but in substantially opposite directions.

A significant advantage of expansion loop 34 is its utilization of cold bent pipe sections 36,38 which can be bent "in the field" at a location near the final assembled location of bent pipe sections 36,38 in pipeline 30. In a preferred embodiment, prior to bending, pipe sections 36,38 can be fabricated and transported in a substantially straight configuration along with straight pipe sections 40,42 of pipeline 30. Preferably, prior to bending, the configuration and metallurgy of bent pipe sections 36,38 is substantially the same as that of straight pipe sections 40,42. Thus, it is preferred for the nominal diameter and wall thickness of bent pipe sections 36,38 to be within about 10 percent of the nominal diameter and wall thickness of straight pipe sections 40,42, more preferably within about 5 percent of the nominal diameter and wall thickness of straight pipe sections 40,42, and most preferably within 2 percent of the nominal diameter and wall thickness of straight pipe sections 40,42. The in-the-field cold bending of bent pipe sections 36,38 allows the distance from the bending location of bent pipe sections 36,38 to the final assembly location of bent pipe sections 36,38 to be minimized. Preferably, the distance from the bending location of bent pipe sections 36,38 to the final assembly location of bent pipe sections 36,38 is less than about 10 miles, more preferably less than about 1 mile, and most preferably less than 0.5 miles. Further, the in-the-field cold bending of bent pipe sections 36,38 allows for easy transportation of pipe sections 36,38 (in their pre-bent straight configuration) over the typically large distance between the fabrication location of pipe sections 36,38 and the bending location of pipe sections 36,38. Typically, the distance between the fabrication location of pipe sections 36,38 and the bending location of pipe sections 36,38 is at least about 10 miles, more typically at least about 50 miles, even more typically at least about 100 miles, and frequently at least 500 miles.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the Doctrine of Equivalents to determine and assess the reasonably fair scope of the present invention as it pertains to any apparatus or method not materially departing from but outside the literal scope of the invention as set forth in the following claims.

What is claimed is:

1. In an above-ground pipeline, the improvement comprising:

an expansion loop including a first cold bent pipe section having a nominal diameter (D) and a bend radius in the range of from about 10 D to about 100 D; and a second cold bent pipe section fluidly coupled to the first cold bent pipe section.

2. The above-ground pipeline of claim 1; and
a substantially straight pipe section fluidly coupled to the first cold bent pipe section,
said substantially straight pipe section and said first cold bent pipe section having substantially the same wall thickness.

3. The above-ground pipeline of claim 2,
said first cold bent pipe section having a wall thickness within about 10% of the wall thickness of the substantially straight pipe section.

4. The above-ground pipeline of claim 1,
said second cold bent pipe section having substantially the same nominal outside diameter and bend radius as the first cold bent pipe section.

5. The above-ground pipeline of claim 1; and a substantially straight pipe section fluidly disposed between the first and second cold bent pipe sections.

6. The above-ground pipeline of claim 1,
said first and second cold bent pipe sections being positioned so that the direction of bending of the first bent pipe section is substantially opposite to the direction of bending of the second cold bent pipe section.

7. The above-ground pipeline of claim 1,
said first cold bent pipe section having a bend angle in the range of from about 10 to about 60 degrees.

8. The above-ground pipeline of claim 1,
said first cold bent pipe section having a bend rate in the range of from about 0.1 to about 10 degrees per foot.

9. The above-ground pipeline of claim 1,
said first cold bent pipe section having a nominal diameter (D) in the range of from about 0.25 to about 10 feet.

10. The above-ground pipeline of claim 1,
said first cold bent pipe section having a bend radius in the range of from about 20 D to about 50 D.

11. The above-ground pipeline of claim 10,
said first cold bent pipe section having a bend angle in the range of from about 20 to about 50 degrees.

12. The above-ground pipeline of claim 11,
said first cold bent pipe section having a bend rate in the range of from about 0.25 to about 5 degrees per foot.

13. The above-ground pipeline of claim 12,
said first cold bent pipe section having a length in the range of from about 30 to about 150 feet, a nominal diameter (D) in the range of from about 0.5 to about 6 feet, and a wall thickness in the range of from about 0.005 D to about 0.25 D.

14. The above-ground pipeline of claim 1,
said first cold bent pipe section being employed as part of an expansion loop of the above-ground pipeline.

15. In an expansion loop of an above-ground pipeline, the improvement comprising:
a first bent pipe section presenting first and second ends;
a first substantially straight pipe section coupled to the first end of the first bent pipe section;
a second substantially straight pipe section fluidly coupled to the second end of the first bent pipe section; and
a second bent pipe section fluidly coupled to the second substantially straight pipe section,
said first bent pipe section having a first wall thickness,
said first substantially straight pipe section having a second wall thickness,
said first and second wall thicknesses being substantially identical.

16. The expansion loop of claim 15,
said first bent pipe section being formed by cold bending a second substantially straight pipe section.

17. The expansion loop of claim 16,
said first and second substantially straight pipe sections having substantially identical nominal outside diameters and wall thicknesses.

18. The expansion loop of claim 15,
said first wall thickness being within 10% of the second wall thickness.

19. The expansion loop of claim 15,
said first bent pipe section having a nominal diameter (D),
said first bent pipe section having a bend radius in the range of from about 10 D to about 100 D.

20. The expansion loop of claim 15,
said first bent pipe section having a bend angle in the range of from about 10 to about 60 degrees.

21. The expansion loop of claim 15,
said first bent pipe section having a bend rate in the range of from about 0.1 to about 10 degrees per foot.

22. The expansion loop of claim 15,
said first wall thickness being within 5% of the second wall thickness,
said first bent pipe section having a bend radius in the range of from about 20 D to about 50 D, a bend angle in the range of from about 25 to about 45 degrees, and a bend rate in the range of from about 0.25 to about 5 degrees per foot.

23. The expansion loop of claim 15,
said second bent pipe section being bent in a direction that is substantially opposite the direction of bending of the first bent pipe section.

24. The expansion loop of claim 15,
said first and second bent pipe sections being cold bent.

25. The expansion loop of claim 15,
said first and second bent pipe sections each having a bend radius in the range of from about 20 D to about 50 D, a bend angle in the range of from about 20 to about 50 degrees, and a bend rate in the range of from about 0.25 to about 5 degrees per foot.

26. In a method of constructing an above-ground pipeline, the improvement comprising the steps of:
(a) creating an expansion loop by carrying out the steps including:
(I) cold bending a first substantially straight pipe section to thereby form a first bent pipe section having a nominal diameter (D) and a bend radius in the range of from about 10 D to about 100 D;
(ii) fluidly coupling the first bent pipe section to a second substantially straight pipe section;
(iii) cold bending a third substantially straight pipe section to thereby form a second bent pipe section; and
(iv) fluidly coupling the second bent pipe section to the second substantially straight pipe section.

27. The method of claim 26,
sub-step (a)(ii) being performed at a location within 10 miles of the location where sub-step a)(I) is performed.

28. The method of claim 26,
sub-step (a)(ii) being performed at a location within 0.5 miles of the location where sub-step (a)(I) is performed.

29. The method of claim 26,
said first and second substantially straight pipe sections having substantially identical nominal diameters and wall thicknesses.

30. The method of claim 26,
said second substantially straight pipe section being fluidly disposed between the first and second bent pipe sections.

31. The method of claim 26,
sub-step (a)(iv) including orienting the second bent pipe section so that the direction of bending of the second bent pipe section is substantially opposite the direction of bending of the first bent pipe section.

32. The method of claim 26,
said first bent pipe section having a bend angle in the range of from about 10 to about 60 degrees.

33. The method of claim 32,
said first bent pipe section having a bend rate in the range of from about 0.1 to about 10 degrees per foot.

34. The method of claim 33,
said first bent pipe section having a length in the range of from about 10 to about 200 feet, a nominal diameter (D) in the range of from about 0.25 to about 10 feet, and a wall thickness in the range of from about 0.005 D to about 0.25 D.

35. The method of claim 26,
said first bent pipe section having a bend angle in the range of from about 25 to about 45 degrees,
said first bent pipe section having a bend rate in the range of from about 0.25 to about 5 degrees per foot,
said first bent pipe section having a length in the range of from about 30 to about 100 feet, a nominal diameter (D) in the range of from about 0.75 to about 4 feet, and a wall thickness in the range of from about 0.005 D to about 0.1 5 D.

36. In a method of constructing an above-ground pipeline, the improvement comprising the steps of:
  (a) fabricating a first substantially straight pipe section at a fabrication location, said first substantially straight pipe section having a length in the range of from about 30 to about 100 feet and a nominal diameter (D) in the range of from about 0.5 to about 6 feet;
  (b) transporting the first substantially straight pipe section to a bending location at least 50 miles from the fabrication location;
  (c) cold bending the first substantially straight pipe section at the bending location to thereby form a bent pipe section having a bend radius in the range of from about 10 D to about 100 D and a bend angle in the range of from about 10 to about 60 degrees;
  (d) transporting said bent pipe section to an assembly location within about 10 miles of the bending location; and
  (e) creating at least a portion of an expansion loop by fluidly coupling the bent pipe section to a second substantially straight pipe section at the assembly location.

37. The method of claim 36,
said bending location being at least 100 miles from the fabrication location,
said assembly location being within 0.5 miles of the bending location.

38. The method of claim 36,
said bent pipe section and said second substantially straight pipe section having substantially the same wall thickness.

39. A method of constructing an above-ground pipeline, said method comprising:
  (a) creating an expansion loop by carrying out the steps including:
    (I) cold bending a first substantially straight pipe section to thereby form a first bent pipe section;
    (ii) cold bending a second substantially straight pipe section to thereby form a second bent pipe section, said first and second bent pipe sections each having a nominal diameter (D) and a bend radius in the range of about 10 D to about 100 D;
    (iii) fluidly coupling a third substantially straight pipe section between the first and second bent pipe sections; and
  (b) placing the expansion loop atop above-ground vertical support members.

40. The method of claim 39,
said first, second, and third substantially straight pipe sections having substantially identical nominal diameters and wall thicknesses.

41. The method of claim 39,
step (a) including orienting the second bent pipe section so that the direction of bending of the second bent pipe section is substantially opposite the direction of bending the first bent pipe section.

42. The method of claim 39,
said first and second bent pipe sections each having a bend angle in the range of from about 25 to about 45 degrees, a bend radius in the range of from about 20 D to about 50 D, a bend rate in the range of from about 0.25 to about 5 degrees per foot, a length in the range of from about 30 to about 100 feet, a nominal diameter (D) in the range of from about 0.75 to about 4 feet, and a wall thickness in the range of from about 0.005 D to about 0.15 D.

43. An above-ground pipeline comprising:
a plurality of support members extending upwardly from the ground; and
an expansion loop supported above the ground on the support members,
said expansion loop including a first bent pipe section, a second bent pipe section, and a first substantially straight pipe section,
said first and second bent pipe sections having a nominal diameter (D) and a bend radius in the range of from about 10 D to about 100 D,
said first substantially straight pipe section being fluidly coupled between the first and second bent pipe sections.

44. The pipeline of claim 43,
said first and second bent pipe sections being formed by cold bending respective second and third substantially straight pipe sections.

45. The pipeline of claim 44,
said first, second, and third substantially straight pipe sections having substantially identical nominal outside diameters and wall thicknesses.

46. The pipeline of claim 43,
said first and second bent pipe sections each having a bend radius in the range of from about 20 D to about 50 D, a bend angle in the range of from about 25 to about 45 degrees, a bend rate in the range of from about 0.25 to about 5 degrees per foot, a length in the range of from about 30 to about 100 feet, a nominal diameter (D) in the range of from about 0.75 to about 4 feet, and a wall thickness in the range of from about 0.005 D to about 0.15 D.

* * * * *